Patented Feb. 18, 1947

2,416,216

UNITED STATES PATENT OFFICE 2,416,216

METHOD FOR THE PREPARATION OF TITANIUM SOLUTIONS

Carl Weber Rau and Francis Edward Swartz, Jr., St. Louis, Mo., assignors to National Lead Company, New York, N. Y., a corporation of New Jersey Application September 19, 1942, Serial No. 459,026

4 Claims. (Cl. 23—117)

This invention relates to the preparation of mineral acid solutions of ferro-titaniferous ores, particularly sulfuric acid solutions of ilmenite.

In the most widely used processes commercially employed in the titanium pigment industry for the preparation of sulfuric acid solutions of titanium, comminuted ilmenite ore is reacted with concentrated sulfuric acid to form a cake of titanium and iron sulfates preparatory to the recovery of the titanium values, either as salts or in the form of hydrous titanium oxide. The reaction cake is cooled, crushed and lixiviated whereby the soluble sulfates, consisting mainly of those of titanium and iron, are dissolved while the undissolved portion, consisting mainly of insoluble titanium and silicon compounds and some unattacked ilmenite ore, to a large extent remains in colloidal suspension in the crude solution thus obtained. In the ensuing processing it is necessary, for various reasons, to subject the crude solution to a reducing treatment in order to convert the ferric iron to the ferrous state and generally a small amount of the titanium to the trivalent state. This reduction treatment facilitates the removal of the unattacked portion of the ore, for example, by coagulation with glue or metal sulfide, according to well known processes of the art, and insures the subsequent recovery of the titanium values in an uncontaminated condition from the clarified solution.

Metallic iron usually in the form of scrap, is the most widely used agent for the reduction of the crude ilmenite solutions. The method ordinarily used is to immerse the scrap iron contained in a basket of acid-proof materials into the hot crude solution. As the metallic iron gradually is taken into solution the ferric iron is reduced to the ferrous state and then a small amount of the titanium to the trivalent state, the latter as a safeguard against reoccurrence of ferric iron during the succeeding steps of processes. Glue, or any other suitable agent, is mixed at this junction with the crude sulfate solution in order to coagulate the suspended matter. As the coagulated residue or "mud" obtained from such clarification operations is rich in titanium values it is usually returned to the process.

The amount of reducing agent consumed in the reduction operation is proportionate to the ferric iron content of the crude solution. Theoretically, one mol equivalent of metallic iron is required to convert two mol equivalents of ferric sulfate to ferrous sulfate, according to the equation:

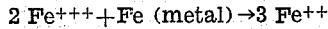

$$2\ Fe^{+++} + Fe\ (metal) \rightarrow 3\ Fe^{++}$$

Actually, under practical conditions, the amount of metallic iron required is considerably higher due to lowered reduction efficiency as evidenced by loss of hydrogen gas during the solubilization of the metallic iron. In general, it can be said that under practical conditions the reduction efficiency usually does not exceed about 80%. Considering, therefore, that some of the ferro-titaniferous ores, such as ilmenite, ordinarily contain a high percentage of ferric iron, it will readily be seen that the reduction of the solutions obtained therefrom will require considerable quantities of metallic iron. As a consequence of the reduction operation the iron content of the resulting solutions will increase, the ratio of titanium to iron will be lowered, the specific gravity of the solution will be increased, thus retarding the settling rate of the coagulated residue and the filtration rate of the coagulated solution. Furthermore, the amount of iron sulfate to be removed by subsequent crystallization is increased. In addition, a disproportionate amount of active acid relative to the titanium content of the ultimate solution is neutralized by the metallic iron when operating according to such prior art methods.

In order to overcome the above enumerated disadvantages which are inherent in the reduction step as practiced in the prior art, we now propose a novel method which hereinbelow will be more fully described.

According to the present invention a sponge iron material obtained from a ferro-titaniferous ore by reduction with, for example, reducing gases or carbonaceous materials at elevated temperatures is employed as the reducing agent for the crude mineral acid solution. During the reduction of the crude solution the metallic portion of the sponge iron material is dissolved while the insoluble portion, consisting mainly of the titanium values and undigestible materials, together with the unattacked portion of the ore used in the digestion reaction is recovered in the "mud" in the following coagulation and settling operation. This "mud" is then returned to a subsequent digestion reaction together with a portion of fresh ore. The ratio of $TiO_2$ to Fe in the digestion is thus increased. As a consequence of the introduction of digestible titanium values with the metallic iron required for the reduction operation, it will be appreciated that it is possible, according to the process of this invention, to prepare solutions in which the ratio of titanium to iron is higher than is possible when operating with metallic iron alone, according to the practices of the prior art.

Accordingly, it is a primary object of the present invention to provide a simple and economical method for the production of mineral acid titanium solutions of high Ti to Fe ratio containing the iron only in the ferrous state. It is also a particular object of the invention to recover and to circulate in the process a coagulated residue or "mud" enriched with respect to titanium values. An additional object of the invention is the solubilization of the titanium values of the residue derived from the ore used in the digestion reaction as well as from the sponge iron material reducing agent, thus increasing the titanium content of the final solution. Still another object is the preparation of a mineral acid solution of titanium and iron in which the ratio of titanium to iron is not unduly lowered by reason of the reduction with metallic iron. A further object is the production of such mineral acid solutions with less expenditure of acid. A still further object is the preparation of mineral acid solution of titanium and iron in which the relative amount of iron salt to be removed by crystallization is reduced. These and other objects will be apparent from the description of our invention.

In order to enable those skilled in the art to practice the present invention we will now proceed to give a detailed description of the operation of the process, two variations of which are diagrammatically sketched in the accompanying drawings.

A finely ground iron-containing titanium ore, preferably ilmenite, containing both ferrous and ferric iron, is mixed with a calculated amount of concentrated sulfuric acid and reacted as by heating in order to initiate an exothermic reaction, whereby a cake of sulfates of titanium and iron is formed. Upon lixiviation of the cooled sulfate cake the metal sulfates are dissolved leaving the undigested portion of the ore in suspension. The ferric portion of the iron in solution is then reduced together with a small portion of the tetravalent titanium, using for that purpose a sponge iron material obtained by reduction of an iron-containing titanium ore, such as, ilmenite, or from an ore poorer in titanium than ordinary ilmenite, such as titano-magnetite and which contains substantially all of its iron in the metallic state as sponge iron. The titanium-bearing sponge iron material is added slowly in small increments to the hot crude ilmenite solution whereby a gradual reduction of the ferric iron and then a small amount of the tetravalent titanium takes place. During this reduction treatment the titanium values contained in the reduced sponge iron material are released for solubilization in a subsequent digestion attack carried out either separately or in admixture with fresh ore. Thus, the thermal reduction of the ferro-titaniferous material not only provides metallic iron for the subsequent reducing treatment of the solution but at the same time provides a material, rich in titanium and poor in iron, when employed in the practice of the invention, boosts the $TiO_2$ : Fe ratio both of the digestion charge and the solution derived therefrom.

Figure 1:
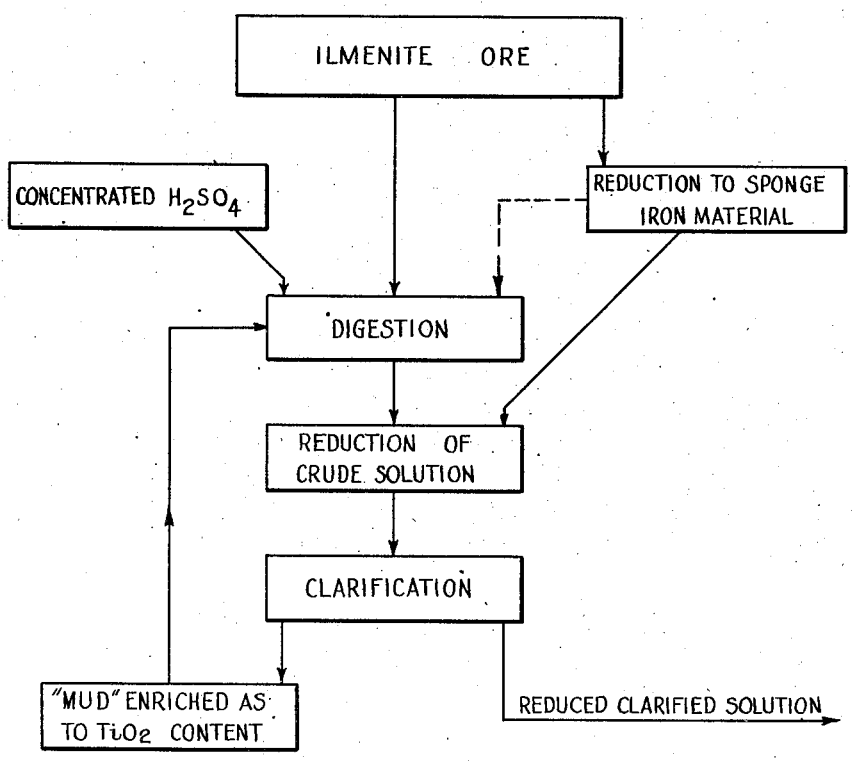
Fig. 1 is a diagrammatic representation of one embodiment of the invention wherein the recovered "mud" is recycled for use in a subsequent digestion.
Figure 2:
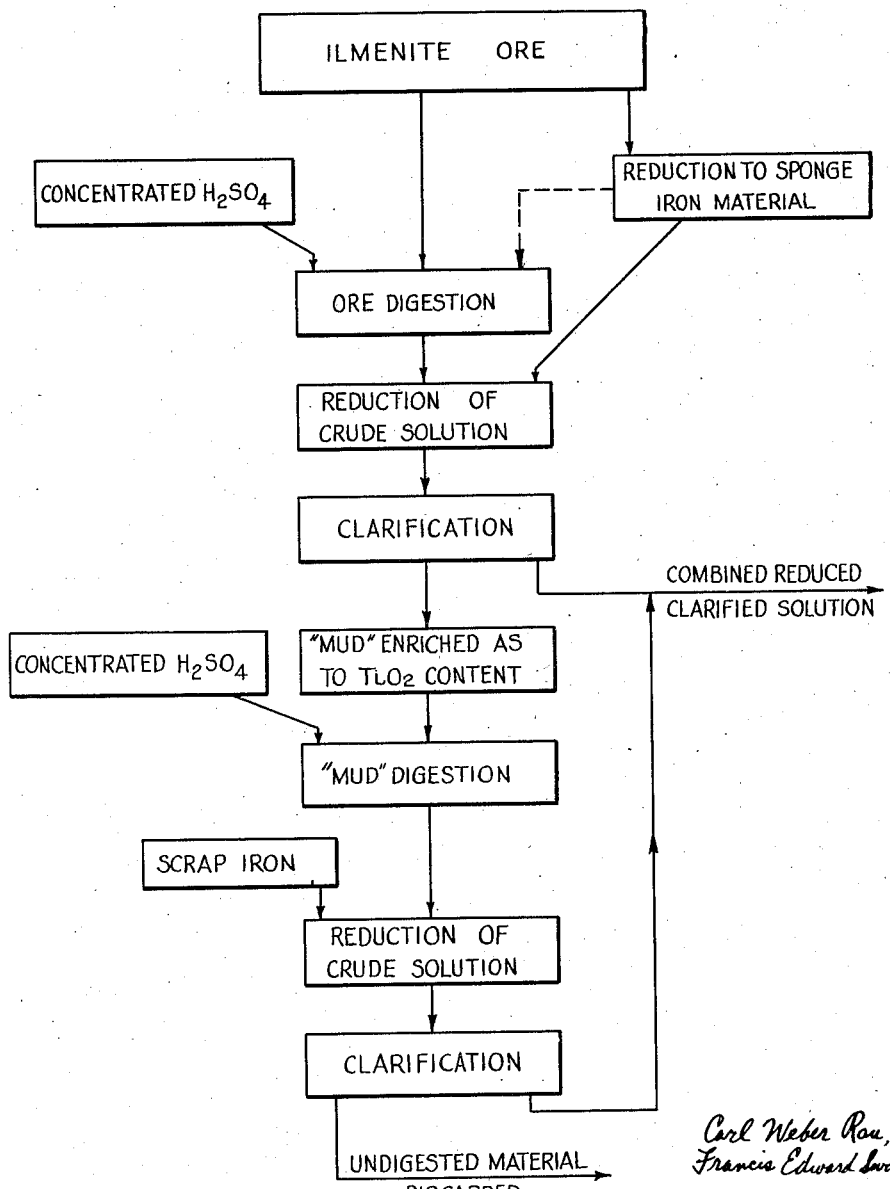
Fig. 2 is a diagrammatic representation of a second embodiment of the invention wherein the recovered "mud" is separately treated with strong sulfuric acid to obtain a titanium-containing solution.

During this operation the solution is agitated at a temperature preferably not exceeding 60° C. Upon completion of the reduction the clarification is accomplished by coagulation and filtration according to any one of the well known methods of the art. The coagulated residue or "mud" which consists of a mixture of (1), the unreacted portion of the ore used in the digestion, and (2), the titanium-bearing residue of the sponge iron material used in the reduction of the crude solution, is separated by settling and filtration and returned to the digestion department where it is subjected to a second attack either in admixture with a fresh batch of ore and concentrated sulfuric acid as indicated in Fig. 1, or in a separate digestion with concentrated sulfuric acid. In the latter case it is preferred to carry out the lixiviation of the "mud"-digestion cake and the ensuing clarification operation apart from the main lixiviation and clarification system, after which the titanium enriched solution obtained from the "mud" is combined with the main solution as indicated in Fig. 2. In this mode of separation practically all of the titanium values are recovered and clogging of the main clarification systems is avoided.

Upon returning the combined residue or "mud" to the main digestion reaction together with fresh ore according to one variation of the procedures of the present invention we may alternate the reduction, first using titanium-bearing sponge iron material and then scrap iron in order to avoid excessive clogging of the clarification system. In that case it is preferred to return the "mud" from the solution which is reduced with titanium-bearing sponge iron material to the digestion reaction and to discard the residue obtained from the ensuing solution which is reduced with scrap iron. In this manner the optimum amount of titanium is solubilized and accumulation of undigestible material is eliminated.

In order further to illustrate the advantages of the present process over prior art practice three experiments are described below. These experiments are given solely for illustrative purposes and are not intended in any way to impose limitations on the scope of the invention.

Three batches of 1000 grams each of finely ground ilmenite ore of the composition 62% $TiO_2$, 1.5% $Fe^{++}$ and 19.5% $Fe^{+++}$ were digested in cast iron pots with concentrated sulfuric acid in a manner customary in the art. The digestion cakes were cooled and lixiviated, and the crude solutions thoroughly mixed and divided into three equal portions.

EXPERIMENT A

*Reduction of the crude ilmenite solution with titanium-bearing sponge iron material derived from the same ilmenite source as was used in the digestion reaction*

The sponge iron material was prepared by subjecting a portion of the ilmenite to a reduction treatment with reducing gases at an elevated temperature until practically all of the iron was converted to the metallic state. The titanium-bearing sponge iron was then cooled in the absence of an oxidizing atmosphere. It analyzed 68% $TiO_2$ and 23% Fe.

One portion of crude solution representing 1000 grams of ilmenite ore, having in suspension the corresponding undigested portion of the ore, was heated and kept at 60° C. under agitation. The type of agitation employed swept the solution downward at the agitator shaft. Small portions of the sponge iron material was added to the solution at intervals until all of the ferric iron and about one gram per liter of the titanium was reduced. In order to insure maximum reduction efficiency the sponge iron material was introduced at the vortex where rapid immersion took place. It was found that a reduction efficiency of about 80 per cent was obtained by this method of operation, an efficiency which compares favorably with the efficiency normally obtained when operating with scrap iron according to the practice of the present art.

The reduced crude solution containing in suspension the unattacked portion of the ore introduced at digestion as well as the titanium values and the gangue material introduced with the sponge iron material was coagulated with glue and settled. The clear solution was then separated from the residue or "mud" by filtration and washing. The volume of the clarified solution was measured and its content of titanium and iron determined. The "mud" was mixed with a new batch of 1000 grams of ilmenite and concentrated sulfuric acid in a second digestion. Lixiviation and reduction with titanium-bearing sponge iron material and clarification with glue was again carried out. Analysis of the clarified solution showed that the yield of titanium was about 90%. The following Table I shows the results obtained.

Table I

|  | First digestion | Second digestion |
| --- | --- | --- |
| Ilmenite ore_____grams__ | 1,000 | 1,000 |
| Sponge iron material (used in reduction) grams__ | 477 | 560 |
| In reduced solution: | | |
| TiO$_2$_____do____ | 558 | 906 |
| Fe_____do____ | 299 | 329 |
| Ratio $\frac{Fe}{TiO_2}$ | .536 | .367 |
| In the "mud": | | |
| TiO$_2$_____grams___ | 386.5 | 395.6 |
| Fe oxides as Fe_____do_____ | 20 | 22 |
| Undigestible_____do_____ | 123 | 247 |

It will be noted from the above table that the accumulation of "undigestible" material is considerable after the second digestion and that bleeding or separate digestion of the "mud" should be employed in continued operation. This experiment clearly shows that when operating according to the process of the present invention the ratio of iron to titanium is considerably decreased.

EXPERIMENT B

*Reduction of the crude ilmenite solution with titanium bearing sponge iron material derived from a titanium-bearing magnetite*

The magnetite was subjected to a reducing treatment with reducing gases at elevated temperature until practically all of its iron content was reduced to the metallic state. The composition of the magnetite and the corresponding sponge iron material was as follows:

|  | Magnetite | Sponge iron material |
| --- | --- | --- |
|  | *Per cent* | *Per cent* |
| TiO$_2$_____ | 11.5 | 15 |
| Fe$_2$O$_3$ as Fe_____ | [1] 57.1 | [1] 73 |
| Not determined_____ | 9.6 | 12 |

[1] Met. iron.

The second portion of the crude solution containing the undigested portion of the ilmenite ore in suspension was heated and kept at 60° C. under agitation. The sponge iron material was added to the agitated solution in the manner described under Experiment A. The reduction efficiency was about 80 per cent. The clarified solution was separated from the "mud" by filtration and washing, the volume of the solution measured and its content of titanium and iron determined. The "mud" was returned to a second digestion with 1000 grams of fresh ground ilmenite ore and concentrated sulfuric acid. A yield of about 90 per cent of the total TiO$_2$ was obtained. Lixiviation, reduction, clarification and separation from the coagulated "mud" was again carried out and the solution analyzed.

The following Table II gives the results obtained.

Table II

|  | First digestion | Second digestion |
| --- | --- | --- |
| Ilmenite ore_____grams__ | 1,000 | 1,000 |
| Sponge iron material (used in reduction) grams__ | 150 | 165 |
| In reduction solution: | | |
| TiO$_2$_____do____ | 558 | 634 |
| Fe_____do____ | 300 | 325 |
| Ratio $\frac{Fe}{TiO_2}$ | .538 | .513 |
| In the "mud": | | |
| TiO$_2$_____grams__ | 84.6 | 95 |
| Fe oxides as Fe_____do____ | 20 | 22 |

The smaller degree of lowering of the ratio of Fe to TiO$_2$ in this instance was due to the low titanium content of the sponge iron material used.

EXPERIMENT C

The third portion of crude ilmenite solution for the sake of comparison with Experiments A and B was subjected to a reduction with scrap iron, according to known practice.

Weighed strips of scrap iron were kept in the hot solution until the reduction was completed. The reduction efficiency was determined from the iron consumed. It was found that the reduction efficiency was about the same as for sponge iron reduction, i. e., about 80 per cent. The "mud" was coagulated and removed from the solution by settling, filtration and washing and then returned to a second digestion together with 1000 grams of fresh ground ilmenite ore and concentrated sulfuric acid. A yield of about 90 per cent of the combined TiO$_2$ content was obtained. The following Table III gives the results of the two digestions.

Table III

|  | First digestion | Second digestion |
| --- | --- | --- |
| Ilmenite ore_____grams__ | 1,000 | 1,000 |
| Strip iron (used for reduction)_____do____ | 110 | 121 |
| In reduced solution: | | |
| TiO$_2$_____do____ | 558 | 614 |
| Fe_____do____ | 299 | 326 |
| Ratio $\frac{Fe}{TiO_2}$ | .536 | .530 |
| In the "mud": | | |
| TiO$_2$_____grams__ | 62 | 68 |
| Fe oxides as Fe_____do____ | 20 | 22 |
| Undigestible_____do____ | [1] | [1] |

[1] Not determined.

The slight decrease in the Fe to TiO$_2$ ratio of the second digestion over that of the first is due to the lower ratio of Fe to TiO$_2$ of the returned "mud." Continued digestions with appropriate bleeding of the circulating "mud" will stabilize the Fe to TiO$_2$ ratio at about .53, a ratio which is higher than the ratio obtainable when operating according to the process of this invention.

As illustrative of the saving of sulfuric acid attained in the present invention, it may be noted that in order to produce an ilmenite solution of about 20% basicity, i. e., containing about 20% less $H_2SO_4$ than theoretically would be required to combine with all the sulfate forming constituents of the solution, from an ilmenite ore containing about 614 parts of titanium, calculated as $TiO_2$ and 332 parts of iron, calculated as Fe, employing a prior art reduction using scrap iron, about 2.92 parts of $H_2SO_4$ are required for every part of titanium ($TiO_2$) contained in the ore. Using the same ore but practicing the reduction according to the present invention using a reduced sponge iron material derived from the ilmenite ore, only about 2.58 parts of $H_2SO_4$ are required to yield a solution of the same basicity.

It is within the scope of the present invention, although to do so involves a lessening of efficiency to some extent, to admix reduced titanium-containing iron material with a reaction mixture of titaniferous ore and sulfuric acid prior to or during reaction in which case, as will be understood, the metallic iron introduced with the reduced titanium-containing material directly effects during reaction a reduction of the ferric iron content of the titaniferous ore.

While we have described our novel process in connection with certain specified conditions it should be understood that the operation of the process is not limited thereto but that the process should be interpreted as broadly as possible in view of the accompanying claims.

We claim:

1. Method for preparing sulfuric acid solutions of titanium and ferrous iron free from ferric iron which comprises heating a ferro-titaniferous material under reducing condition until the iron content thereof is converted to metallic state, mixing with unreduced titaniferous ore containing ferric iron an amount of said reduced ferro-titaniferous material containing sufficient metallic iron to reduce the ferric iron of the unreduced ore to ferrous state and a small amount of titanium to titanous state, reacting the mixture with concentrated sulfuric acid to form a semi-solid reaction mass and dissolving the soluble portions of said reaction mass.

2. Method for preparing sulfuric acid solutions of titanium and ferrous iron free from ferric iron which comprises heating a ferro-titaniferous material under reducing condition until the iron content thereof is converted to metallic state, mixing with unreduced titaniferous ore containing ferric iron an amount of said reduced ferro-titaniferous material containing sufficient metallic iron to reduce the ferric iron of the unreduced ore to ferrous state and a small amount of titanium to titanous state, reacting the mixture with concentrated sulfuric acid to form a semi-solid reaction mass, dissolving the soluble portions of said reaction mass, separating the resulting solution from insoluble residues and mixing said residues with a fresh reaction charge of unreduced titaniferous ore containing ferric iron, reduced titanium-containing metallic iron and concentrated sulfuric acid.

3. Method according to claim 2 wherein the ferro-titanium material subjected to thermal reduction is ilmenite.

4. Method according to claim 2 wherein the ferro-titanium material subjected to thermal reduction is titano-magnetite.

CARL WEBER RAU.
FRANCIS EDWARD SWARTZ, Jr.

REFERENCES CITED

The following references are of record in the file of this patent:

UNITED STATES PATENTS

| Number | Name | Date |
|---|---|---|
| 1,831,852 | Farup | Nov. 17, 1931 |
| 1,891,911 | Brode et al. | Dec. 27, 1932 |
| 1,489,417 | Bachman | Apr. 8, 1924 |
| 2,098,026 | Booge et al. | Nov. 2, 1937 |
| 1,196,029 | Rossi | Aug. 29, 1916 |
| 2,278,709 | Moran | Apr. 7, 1942 |
| 2,309,988 | Ryan | Feb. 2, 1943 |